(12) United States Patent
Jacquet et al.

(10) Patent No.: US 9,154,422 B2
(45) Date of Patent: Oct. 6, 2015

(54) POLICING IN DATA NETWORKS

(75) Inventors: Arnaud Jacquet, Ipswich (GB); Tobias Moncaster, Colchester (GB); Robert J Briscoe, Woodbridge (GB)

(73) Assignee: British Telecommunications PLC, London (GB)

( * ) Notice: Subject to any disclaimer, the term of this patent is extended or adjusted under 35 U.S.C. 154(b) by 170 days.

(21) Appl. No.: 13/258,291

(22) PCT Filed: Mar. 25, 2010

(86) PCT No.: PCT/GB2010/000574
§ 371 (c)(1),
(2), (4) Date: Sep. 21, 2011

(87) PCT Pub. No.: WO2010/109201
PCT Pub. Date: Sep. 30, 2010

(65) Prior Publication Data
US 2012/0016986 A1     Jan. 19, 2012

(30) Foreign Application Priority Data

Mar. 26, 2009  (EP) ..................................... 09250868

(51) Int. Cl.
*G06F 15/173* (2006.01)
*H04L 12/801* (2013.01)
(Continued)

(52) U.S. Cl.
CPC ................ *H04L 47/10* (2013.01); *H04L 47/11* (2013.01); *H04L 47/12* (2013.01); *H04L 47/20* (2013.01); *H04L 47/32* (2013.01); *H04L 47/35* (2013.01)

(58) Field of Classification Search
CPC ......... H04L 47/00; H04L 47/10; H04L 47/20; H04L 47/215

USPC ........................................... 709/224; 370/235
See application file for complete search history.

(56) References Cited

U.S. PATENT DOCUMENTS 5,781,532 A     7/1998  Watt
6,781,996 B1 *  8/2004  Hemmady ............... 370/395.21
(Continued)

FOREIGN PATENT DOCUMENTS

EP     0 955 749     11/1999
EP     1 758 313     2/2007
(Continued)

OTHER PUBLICATIONS

International Search Report for PCT/GB2010/000574, mailed Jun. 25, 2010.
(Continued)

*Primary Examiner* — Vivek Srivastava
*Assistant Examiner* — Karina J Garcia-Ching
(74) *Attorney, Agent, or Firm* — Nixon & Vanderhye PC (57) ABSTRACT

Apparatus and methods for policing flows of data units (15) along a path in a data network in dependence on congestion indications associated with said data units indicating whether or not said data units have experienced, or are expected to experience, congestion on the path, said apparatus and methods allowing for a high but not unlimited short-term burst rate ($w_{ST}$) of data units having congestion indications associated therewith, the short-term burst rate being high when compared with a long-term average rate ($w_{LT}$) at which data units having congestion indications associated therewith may be forwarded without the data units being subjected to a policing action such as dropping, delaying or marking for possible sanction.

19 Claims, 7 Drawing Sheets

Basic Congestion Policer (51) Int. Cl.
*H04L 12/813* (2013.01)
*H04L 12/823* (2013.01)

(56) References Cited

U.S. PATENT DOCUMENTS 7,965,638 B1 * 6/2011 Schzukin et al. .......... 370/235.1
8,719,443 B2 * 5/2014 Xu et al. ....................... 709/233

FOREIGN PATENT DOCUMENTS

| WO | WO 2005/096566 | 10/2005 |
| WO | WO 2005/096567 | 10/2005 |
| WO | WO 2006/082443 | 8/2006 |

OTHER PUBLICATIONS

Written Opinion of the International Searching Authority for PCT/GB2010/000574, mailed Jun. 25, 2010.
European Search Report for EP Application No. 09250868, dated Jul. 17, 2009.
Briscoe, B. et al., "RE-ECN: The Motivation for Adding Congestion Accountability to TCP/IP", Transport Area Working Group, (Mar. 2, 2009), 50 pages.
Briscoe, B. et al., "Policing Congestion Response in an Internetwork using Re-feedback", SIGCOMM'05, (Aug. 22-26, 2005), pp. 277-288.
Kelly, F.P. et al., "Rate Control for Communication Networks: Shadow Prices, Proportional Fairness and Stability", Journal of the Operational Research Society, vol. 49, No. 3, (1998), pp. 237-252.
Jacquet, A. et al., "Policing Freedom to Use the Internet Resource Pool", Workshop on Re-architecting the Internet (REARCH'08), (Dec. 9, 2008), 6 pages.
Floyd, S. et al., "Random Early Detection Gateways for Congestion Avoidance", IEEE/ACM Transactions on Networking, vol. 1, No. 4, (Aug. 1993), pp. 397-413.
Ramakrishnan, K. et al., "The Addition of Explicit Congestion Notification (ECN) to IP", RFC 3168, (Sep. 2001), 59 pages.
Spring, N. et al. "Robust Explicit Congestion Notification (ECN) Signaling with Nonces", RFC 3540, (Jun. 2003), 13 pages.
Briscoe, B. et al., "Re-ECN: Adding Accountability for Causing Congestion to TCP/IP", IETF Internet-Draft, (Mar. 3, 2009), 48 pages.
Wallace, K. "Weighted Random Early Detection (WRED)", Cisco Press, (Nov. 24, 2004), 5 pages.
Office Action issued on Sep. 27, 2013 in corresponding European Application No. 10710891.2.

* cited by examiner

Figure 1 - Basic Congestion Policer

Figure 2 - Problem with single-limit congestion policer

Figure 3 - Effect of double-limit policer

Figure 4 - Double-limit Congestion Policer

Figure 5 – Possible penalty curves

Figure 6 - Flow chart where sanction is packet dropping

Figure 7 - Flow chart where sanction is not packet dropping

POLICING IN DATA NETWORKS

This application is the U.S. national phase of International Application No. PCT/GB2010/000574 filed 25 Mar. 2010, which designated the U.S. and claims priority to EP Application No. 09250868.8 filed 26 Mar. 2009, the entire contents of each of which are hereby incorporated by reference.

TECHNICAL FIELD

The present invention relates to apparatus and methods for policing the flow of data units along paths in data networks. More specifically, aspects of the present invention relate to apparatus and methods for policing the flow of data units along paths in data networks in dependence on congestion characteristics associated with the data units.

BACKGROUND TO THE INVENTION AND PRIOR ART

The Internet is a shared communication medium, whose resources every user has the opportunity to use. Its value chain now involves a strong diversity of stakeholders, some of whom can have conflicting interests in the way the shared resources are managed. This state of affairs has been exacerbated by the network neutrality debate over the past few years. At the technical level, the debate boils down to assessing which control mechanisms are adequate for network operators to employ to mitigate the impact of some customers' heavy usage so that usage doesn't cause a deterioration in the network service every other customer can get from the connectivity product they have subscribed to. Insomuch as it is possible, it is important that such policing mechanisms should deal with the physical impact of a customer's traffic on the network, rather than its nature.

At the moment most network operators have defined "fair usage" policies which specify the traffic limits to which customers will be subjected, based on the product they have subscribed to. This can include a specific upper limit for the amount of peer-to-peer traffic that can be generated at peak hours: peer-to-peer traffic can indeed very easily take over disproportionate amounts of access bandwidth because of the way peer-to-peer applications have been designed.

However that approach is of limited efficiency: it assumes that all traffic using a known protocol (which on average causes congestion in the network) is responsible for increases in congestion, and that only that traffic is responsible for that congestion. If a new peer-to-peer application was designed that only uses uncongested network path links to operate, it would be penalised as much as any other peer-to-peer traffic application. On the other hand, heavy, live multimedia exchanges across congested links might hardly be affected by traditional policing techniques but could still contribute disproportionately to network congestion.

Based on the economics of networks, it has been shown (see [Kelly98] for example) that controlling the congestion a customer creates is a much better way to ensure the efficient usage of a shared resource than controlling the raw amount of traffic the customer generates. Congestion pricing is a way to ensure users are held accountable for the amount of congestion they create. However, users are wary of being exposed to such dynamic variation of prices as could occur with prices based on network congestion.

It has been advocated (see [Briscoe07]) that using congestion capping would present substantially similar advantages to using congestion pricing, while avoiding exposing users directly to dynamic congestion prices.

Re-Feedback

The re-feedback framework has been developed to allow for customers' usage to be accounted for based on the congestion externality they cause to other users. It will be understood that one of the functions of the Internet Protocol (IP) header is to carry path information from a sender to a receiver. This path information allows downstream nodes (nodes nearer the receiver) to learn about the upstream state of the path. Mechanisms exist which allow the receiver to feed this information back to the sender. The re-feedback proposal (see [Briscoe05c] for example) provides a mechanism whereby path information that a receiver feeds back to a sender can be re-inserted into the forward data path, thus allowing nodes along the path to learn information relating to the downstream state or the path as well as information about the upstream state of the path.

International patent applications WO 2005/096566 and WO 2005/096567 relate to data networks, and to nodes making up parts of data networks, arranged to derive information relating to the characterisation of paths taken by data travelling between nodes in the networks according to the re-feedback proposal.

Congestion Signalling and Responses Thereto

It will be understood that data traversing the Internet follows a path between a series of routers, controlled by various routing protocols. Each router seeks to move packets closer to their final destination. If too much traffic traverses the same router in the network, the router can become congested and packets start to experience excessive delays whilst using that network path. If sources persist in sending traffic through that router it could become seriously overloaded (congested) and even drop traffic (when its buffers overflow). If sources still persist in sending traffic around this bottleneck it could force more routers to become congested, and if the phenomenon keeps spreading, that can lead to a congestion collapse for the whole Internet—which occurred regularly in the mid-eighties.

A solution to that problem has been to ensure that sources take responsibility for the rate at which they send data over the Internet by implementing congestion control mechanisms. According to these mechanisms, sources are required to monitor path characterisation metrics to detect when the path their data is following is getting congested, in which case they react by reducing their throughput. In the absence of such congestion indications, they may slowly increase their throughput. The congestion level is one of the parameters controlling the rate adaptation of a source sending data over a congested path.

The congestion level can be signalled either implicitly (through congested routers dropping packets when their buffers overflow or to protect themselves) or explicitly (through mechanisms such as explicit congestion notification—see next subsection). Currently the most common option is implicit signalling. Historically, routers would drop packets when they got completely saturated (which happens when a traffic burst cannot be accommodated in the buffer of the router)—this policy is called "Droptail". Random Early Detection (RED) (see [RED]) is an improvement where routers monitor the average queue length in their buffer and when the average queue is higher than a given threshold, the router starts to drop packets with a probability which increases with the excess length of the queue over the threshold. It is widely used in today's Internet because it allows sources to react more promptly to incipient congestion. Sources using Transmission Control Protocol (TCP) are able to detect losses, because a packet loss causes a gap in the sequence; whenever a TCP source detects a loss, it is meant to halve its data transmission rate, which should alleviate the congestion on the router at the bottleneck.

Explicit Congestion Notification

Explicit Congestion Notification (ECN) (see [ECN]) further improves on RED by using a two-bit ECN field in the IP header to signal congestion. It runs the same algorithm as RED, but instead of dropping a packet, it sets its ECN field to the Congestion Experienced (CE) codepoint. The ECN standard requires a sender to echo any congestion mark signalled in the data; for instance, a TCP receiver sets the Echo Congestion Experienced (ECE) flag in the TCP header, which the TCP source interprets as if a packet has been dropped for the purpose of its rate control. In turn the source then reacts to the congestion by halving its transmission rate and notifies the receiver of this using the Congestion Window Reduced (CWR) codepoint.

The four values of the two-bit ECN field in the IP header are:
- Non ECT, which signifies that the packet belongs to a flow that doesn't support ECN.
- ECT(0) and ECT(1), which signify that the packet belongs to a flow that supports ECN but that upstream routers haven't had to mark the packet.
- Congestion Experienced (CE), which signals that a packet has experienced incipient congestion.

It will be understood that allowing a sender to initially assign either of two different codepoints (i.e. "ECT(0)" and "ECT(1)") to a packet enables the sender to detect if network elements are fraudulently erasing CE codepoints. If a packet which has experienced congestion and therefore has been marked with a "CE" codepoint subsequently has that CE codepoint removed in an attempt to hide the indication that the packet has experienced congestion, this will be detectable by the sender unless the CE codepoint has been changed back to the correct one of the two possible initial codepoints. This is discussed further in [RFC3540].

Congestion Policing

International patent application WO 2006/082443, which is further discussed in [Jacquet08], and related European patent application EP 1,758,313 (from which WO 2006/082443 claims priority) relate to methods and apparatus for policing the congestion responsiveness of individual flows (rather than that of a customer). They disclose methods and apparatus for policing flow in a data network by determining a measure of greediness of a flow through a node, comparing said measure of greediness with a measure indicative of acceptable greediness dependent on the expected greediness of a compliant flow experiencing substantially similar path conditions, and designating the flow for possible sanction in the event that the greediness is not in accordance with said acceptable greediness.

Mechanisms have since been proposed which use concepts based on the re-feedback proposal, and promote the use of congestion cap with connectivity products.

Re-ECN (see [Briscoe09a]) is an example of a system that utilises the re-feedback concept, whereby path information that a receiver feeds back to a sender can be "re-inserted" into the forward data path, in order to provide upstream and downstream congestion information throughout the network. With re-ECN, the information "re-inserted" is based on ECN marks in previously transmitted packets. It is similar to ECN but uses an extra bit in the packet header. This bit enables a number of new codepoints to be used. A simple way to understand the re-ECN protocol is to think of each packet as having a different colour flag (corresponding to a codepoint). At the start of a flow, a green flag (FNE or "feedback not established") is used to indicate that a sender doesn't have existing knowledge of the path. Green flags are also used when the sender is unsure about the current state of the path. By default packets are marked with grey flags. If they encounter congestion during their progress through the network they are marked with a red flag. The destination will send back a count of the number of red flags it has seen. For every red flag it is informed of, the sender should send a packet with a black flag (re-echo). These black flags cannot be modified once they are set by the sender, so signal to a node at any point on the path what the total end-to-end congestion is expected to be (based on the fact that the number of black flags signals the total end-to-end congestion level actually experienced by the immediate predecessors of the current packets). At any intermediate node the upstream congestion is given by the number of red flags seen, and the downstream congestion may therefore be derived by the difference between the number of red flags and the number of black flags.

Mechanisms based on the concept referred to as "re-ECN" are discussed in [Briscoe09a]. A related Internet Draft, referred to as [Briscoe09b], discusses the motivation for deploying such mechanisms. It provides examples of mechanisms that can use the re-ECN protocol to ensure that data sources respond correctly to congestion, and examples of mechanisms that are able to ensure that the dominant selfish strategy of both network domains and end-points will be to use the protocol honestly.

One such mechanism proposed in [Briscoe09a], which will be explained with reference to FIG. 1, consists of using a basic token bucket which is operated based on the amount of congestion a user creates on the network, rather than the volume of traffic it generates. Such a mechanism is therefore referred to as a "Congestion Policer", rather than a "Rate Policer".

Figure 1:
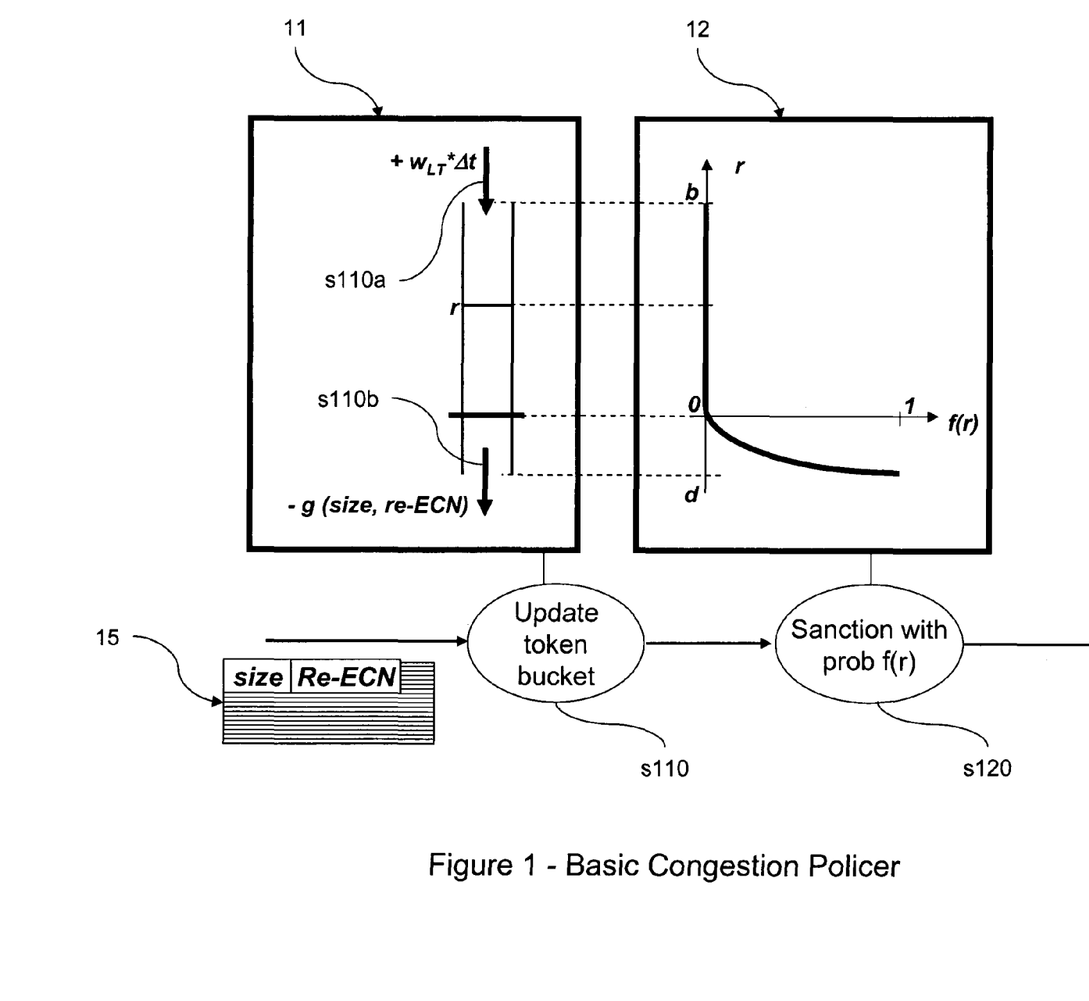
FIG. 1 shows a schematic diagram of a basic Congestion Policer.

As illustrated in FIG. 1, the token bucket 11 is filled at a constant rate, and emptied in proportion to the contribution of the user's traffic to network congestion. First, when a packet 15 arrives at the policing node, the token reserve r is updated (step s110). This updating involves two factors: the token reserve r is updated by adding tokens in proportion to a predetermined congestion allowance $w_{LT}$ of the user (step s110a). The token reserve r is also updated by removing tokens (step s110b) according to a function g( ) whose value depends on information retrieved from the packet header, in particular the size $s_i$ and the re-ECN field (which reflects a congestion level $p_i$). The function g( ) could be defined as:

| g(packet) = $s_i$ | if the re-ECN codepoint signals a mark |
|---|---|
| g(packet) = 0 | otherwise |

Subsequently, the packet is sanctioned (step s120) according to the relevant policy 12 with a probability f(r) where the sanction curve f( ) is null so long as the value of the token reserve r remains positive.

Figure 2:
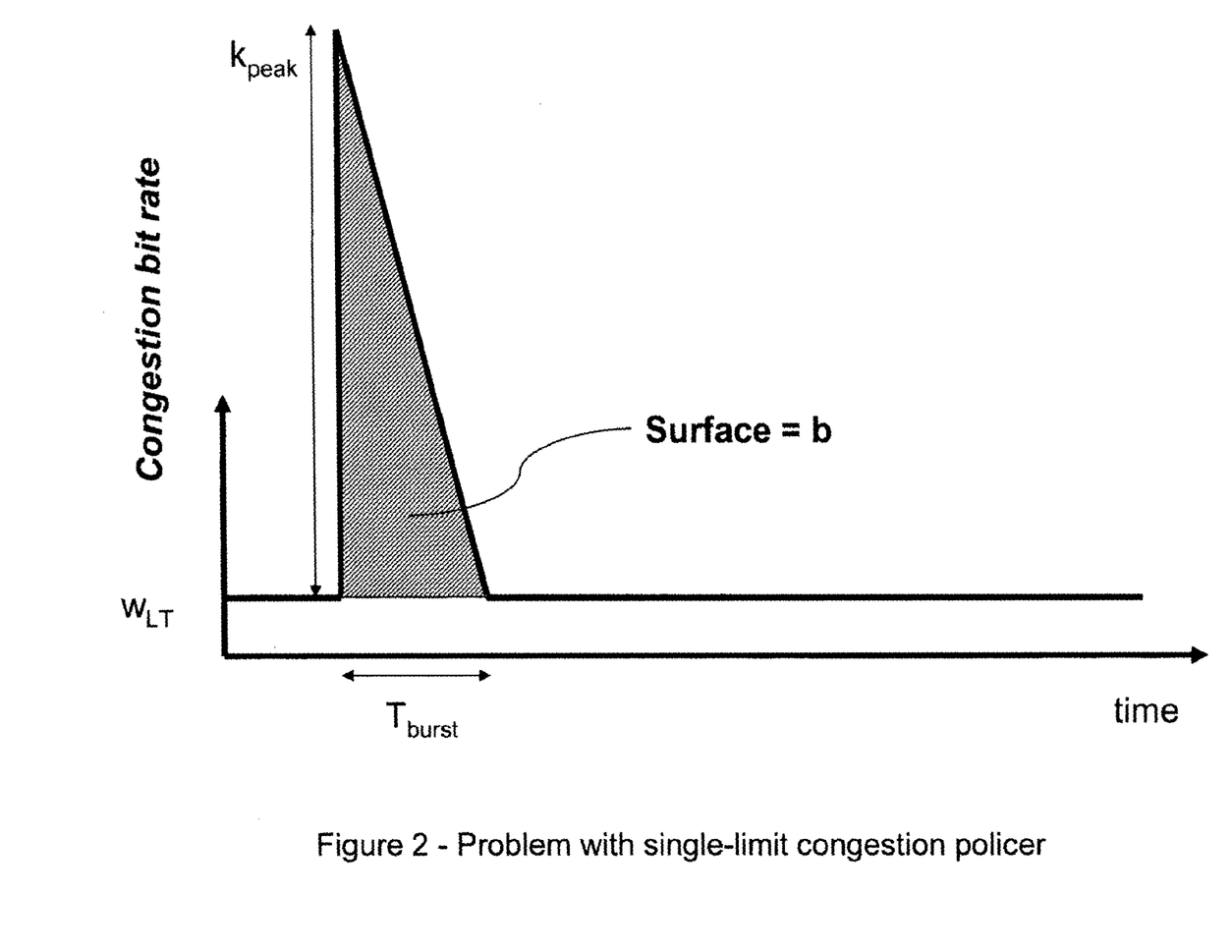
FIG. 2 is a graph which serves to illustrate a problem that may exist with single-limit congestion policer.

Such a mechanism puts an upper bound on the amount of congestion a user can cause in the long term. However one of the limitations of the mechanism is that it allows a user to create bursts of congestion. If the user has remained inactive for a long period of time, tokens will accumulate in the token bucket during such a period. If the user then becomes active again, it can consume the token reserve at a very quick pace, which could push congestion levels at bottlenecks to critical levels for at least a short period of time. This effect is illustrated in FIG. 2: even if the token reserve a user can accumulate is limited to a maximum level b (symbolised by the area shown as "surface b" on the graph, which can be regarded as indicating an agreed maximum amount of the user's "congestion allowance" that the user can hold in reserve in order to enable its future traffic that has already contributed to congestion still to be forwarded in the normal manner), if the user consumes that token reserve over a short period of time $T_{burst}$, then it can cause a spike of congestion $k_{peak}$ in proportion to $b/T_{burst}$.

Protection against this is possible by setting a tight limit to the depth of the bucket b, thus limiting the potential amount of congestion of a future burst, however this would be very restrictive for users who only use their network congestion sporadically.

Other Known Techniques

Mechanisms to police data rates over two time-scales have been proposed. For instance the Weighted Random Early Detection (WRED) proposal (see [WRED]) proposes a dual token bucket to limit the throughput of a user to a Committed Information Rate (CIR) in the long-term, and a Peak Information Rate (PIR) bucket in the short-term, which allows for manageable bursts of traffic. It will be noted, however, that this mechanism deals only with traffic throughput.

REFERENCES

[Kelly98] F. P. Kelly, A. K. Maulloo & D. K. H. Tan: "Rate Control for Communication Networks: Shadow Prices, Proportional Fairness and Stability", Journal of the Operational Research Society, 49(3):237-252 (1998).

[Briscoe07] B. Briscoe: "Flow Rate Fairness: Dismantling a Religion", ACM Computer Communications Review 37(2) 63-74 (April 2007).

[Briscoe05c] B. Briscoe, A. Jacquet, C. Di Cairano-Gilfedder, A. Salvatori, A. Soppera & M. Koyabe: "Policing Congestion Response in an Internetwork using Re-feedback", In Proc ACM SIGCOMM'05, Computer Communications Review 35(4) (September 2005).

[RED]: S Floyd & V Jacobson: "Random Early Detection Gateways for Congestion Avoidance", IEEE/ACM Transactions on Networking, Vol 1-4 (397-413) August 1993.

[ECN]: K Ramakrishnan, S Floyd & D Black: "The Addition of Explicit Congestion Notification (ECN) to IP", RFC 3168, September 2001.

[RFC3540]: N. Spring, D. Wetherall & D. Ely: "Robust Explicit Congestion Notification (ECN) Signaling with Nonces", RFC 3540, June 2003.

[Jacquet08] A. Jacquet, B. Briscoe & T. Moncaster: "Policing Freedom to Use the Internet Resource Pool", Workshop on Re-Architecting the Internet (ReArch'08) (December 2008)

[Briscoe09a] B. Briscoe, A. Jacquet, T. Moncaster & A. Smith: "Re-ECN: Adding Accountability for Causing Congestion to TCP/IP", IETF Internet-Draft <draft-briscoe-tsvwg-re-ecn-tcp-07.txt> (3 Mar. 2009)

[Briscoe09b] B. Briscoe, A. Jacquet, T. Moncaster & A. Smith: "Re-ECN: The Motivation for Adding Congestion Accountability to TCP/IP", IETF Internet-Draft <draft-briscoe-tsvwg-re-ecn-tcp-motivation-00.txt> (2 Mar. 2009)

[WRED] K. Wallace: "Weighted Random Early Detection (WRED)", dated November 2004, found on the Internet: http://www.ciscopress.com/articles/article.asp?p=352991&seqNum=9

SUMMARY OF THE INVENTION

According to a first aspect of the present invention, there is provided an apparatus for policing a flow of data units along a path in a data network, said data units having congestion indications associated therewith indicating whether or not said data units have experienced or are expected to experience congestion on the path; said apparatus comprising:
  a receiver for receiving data units;
  a data unit monitor operable to read congestion indications associated with received data units;
  a policer comprising:
    a register operable to hold a reserve value indicative of a current reserve level;
    a register updater operable to update the reserve value at a predetermined rate, and further to update the reserve value in dependence on congestion indications associated with received data units; and
    a policing component operable to perform a policing action in respect of a data unit in dependence on a predetermined policing function such that the probability of said policing action being performed in respect of said data unit is dependent on the current reserve value;
  and
  a rate-controller comprising a buffer operable to delay one or more data units for a period of time dependent on the congestion indications associated with said one or more data units.

As will be understood, "upstream" congestion indications are effectively indicative of congestion already experienced by data units (such as packets) while travelling along a path in a data network. It will also be understood that "end-to-end" congestion indications (which can generally be set in "subsequent" data units—in dependence on a measure of end-to-end congestion experienced by "previous" data units while traversing the path in question, for example—before those subsequent data units leave the first node on the path in question) are indicative of congestion expected to be experienced by those subsequent data units while travelling along the (remainder of) the path to the intended destination of the data. Such end-to-end congestion indications may thus be taken to be indicative of expected congestion. At any node along a path (i.e. any intermediate node), experienced "upstream" congestion indications and expected "end-to-end" congestion indications can be used to obtain indications of expected congestion on the remaining part (i.e. the "downstream" part from the point of view of the intermediate node in question) of the end-to-end path by subtracting the former from the latter, for example.

According to some embodiments, the receiver may be arranged to make received data units available for processing by the policer; the policer being arranged to make at least some of the data units available for processing by the rate-controller; and the rate-controller being arranged to make at least some of the data units available for forwarding from the apparatus. Data units may thus be processed by the policer before any processing by the rate-controller.

According to alternative embodiments, the receiver may be arranged to make received data units available for processing by the rate-controller; the rate-controller being arranged to make at least some of the data units available for processing by the policer; and the policer being arranged to make at least some of the data units available for forwarding from the apparatus. Data units may thus be processed by the rate-controller before being processed by the policer.

The policing action may comprise one or more of the following actions in respect of a data unit: dropping the data unit; delaying onward transmission of the data unit; assigning a sanction indication to the data unit whereby to enable the data unit to be identified for subsequent sanction; issuing a report to a network control unit in respect of the data unit. Other types of sanction may be used, such as charging a sender or receiver at a higher or punitive rate for data units that have been assigned a sanction indication, or for data units in respect of which a report has been issued, for example.

The congestion indications associated with the data units may simply provide a "binary" indication of whether or not the data unit with which they are associated has experienced or is expected to experience congestion. Alternatively or additionally, the congestion indications associated with the data units may each provide an indication of the level of congestion experienced by, or expected to be experienced by, the data unit with which they are associated. Where this is the case, the apparatus may be arranged also to be responsive to levels of congestion indicated as having been experienced by, or expected to be experienced by, individual data units. This may be achieved by virtue of the register updater being further operable to update the reserve value in dependence on the levels of congestion indicated by the congestion indications as having been experienced by, or expected to be experienced by, the data units. Alternatively or additionally, this may be achieved by virtue of the rate-controller being operable to delay data units for periods of time dependent on the levels of congestion indicated by the congestion indications as having been experienced by, or expected to be experienced by, the data units.

The apparatus may be arranged to police the flow without reference to the size of data units. Alternatively, the apparatus may be arranged to be responsive to the size of data units received, in order to be able to take into account that large data units having congestion indications associated therewith may cause greater problems within a network than small data units having congestion indications associated therewith, for example. This may be achieved by virtue of the data unit monitor being further operable to determine size measures in respect of received data units indicative of the size of the data units. In such embodiments, the register updater may further be operable to update the reserve value in dependence on the size measures determined in respect of the data units. Alternatively or additionally, the rate-controller may be operable to delay data units for periods of time dependent on the size measures determined in respect of the data units.

According to preferred embodiments, the register updater may be operable to update the reserve value at the predetermined rate whereby to increase the difference between the reserve level indicated by the reserve value and a predetermined threshold level, and to update the reserve value in dependence on the congestion indications whereby to decrease the difference between the reserve level indicated by the reserve value and the predetermined threshold level. Thus, while the updates at the predetermined rate may cause the reserve value held in the register to be incremented, updates made in dependence on the congestion indications may cause the reserve value held in the register to be decremented. The directions in which the two types of update cause the reserve value to change may be reversed from this, however.

The register updater may be arranged to prevent the reserve value from being updated beyond either or both of a predetermined maximum value and a predetermined minimum value. Other mechanisms may be used in order to impose upper and/or lower limits on the value that may be held by the register. Alternatively, the range of values that may be held by the register may be unbounded at either or both ends.

According to preferred embodiments, the policer and the rate-controller may be arranged such as to allow data units having congestion indications associated therewith to be forwarded at least during a temporary period of high congestion at a rate that is greater than an average rate over a period longer than the temporary period at which the predetermined rate at which the register updater updates the reserve value allows data units having congestion indications associated therewith to be processed by the policer without having a policing action performed thereon. In a simple situation where all data units are the same size and each may carry a simple "binary" indication of whether or not it has experienced, or is expected to experience, congestion, if the rate at which the rate-controller permits data units having congestion indications associated therewith to be forwarded is greater than the average rate at which the ongoing updating of the reserve value at the predetermined rate would allow data units having congestion indications associated therewith to be continually processed without being subjected by the policer to a policing action, then the apparatus may be arranged to allow for occasional short-term bursts of data units having congestion indications associated therewith to be forwarded without sanction at a high "short-term" rate in comparison with a general "long-term" rate at which the apparatus may continually forward data units having congestion indications associated therewith out sanction. In other less simple situations, where data units are not all of the same size, and/or where data units may carry indications of different levels of congestion experienced, or indications of different levels of congestion expected to be experienced, for example, the relationships between the respective algorithms and/or parameters by which the policer and the rate-controller operate may be set in a variety of different ways in order to allow for a high but not unlimited "short-term burst" rate of congested packets compared to a lower "long-term average" rate of "acceptable" congestion (i.e. a long-term average rate of congested packets that will not result in policing actions being performed).

According to a second aspect of the present invention, there is provided a method for policing a flow of data units along a path in a data network, said data units having congestion indications associated therewith indicating whether or not said data units have experienced or are expected to experience congestion on the path; said method comprising:

receiving data units;
reading congestion indications associated with received data units;
a policing process comprising:
  holding a reserve value indicative of a current reserve level; updating the reserve value at a predetermined rate, and further updating the reserve value in dependence on congestion indications associated with received data units; and
  performing a policing action in respect of a data unit in dependence on a predetermined policing function such that the probability of said policing action being performed in respect of said data unit is dependent on the current reserve value;
and
a rate-control process comprising:
  delaying one or more data units for a period of time dependent on the congestion indications associated with said one or more data units The policing process in respect of a particular data unit may be performed before or after the rate-control process. The two processes may also be performed contemporaneously.

The method may further comprise forwarding at least some of the received data units on towards an eventual destination after subjecting the data units to the policing process and the rate-control process.

The various options and preferred embodiments referred to above in relation to the first aspect are also applicable in relation to the second aspect.

Figure 3:
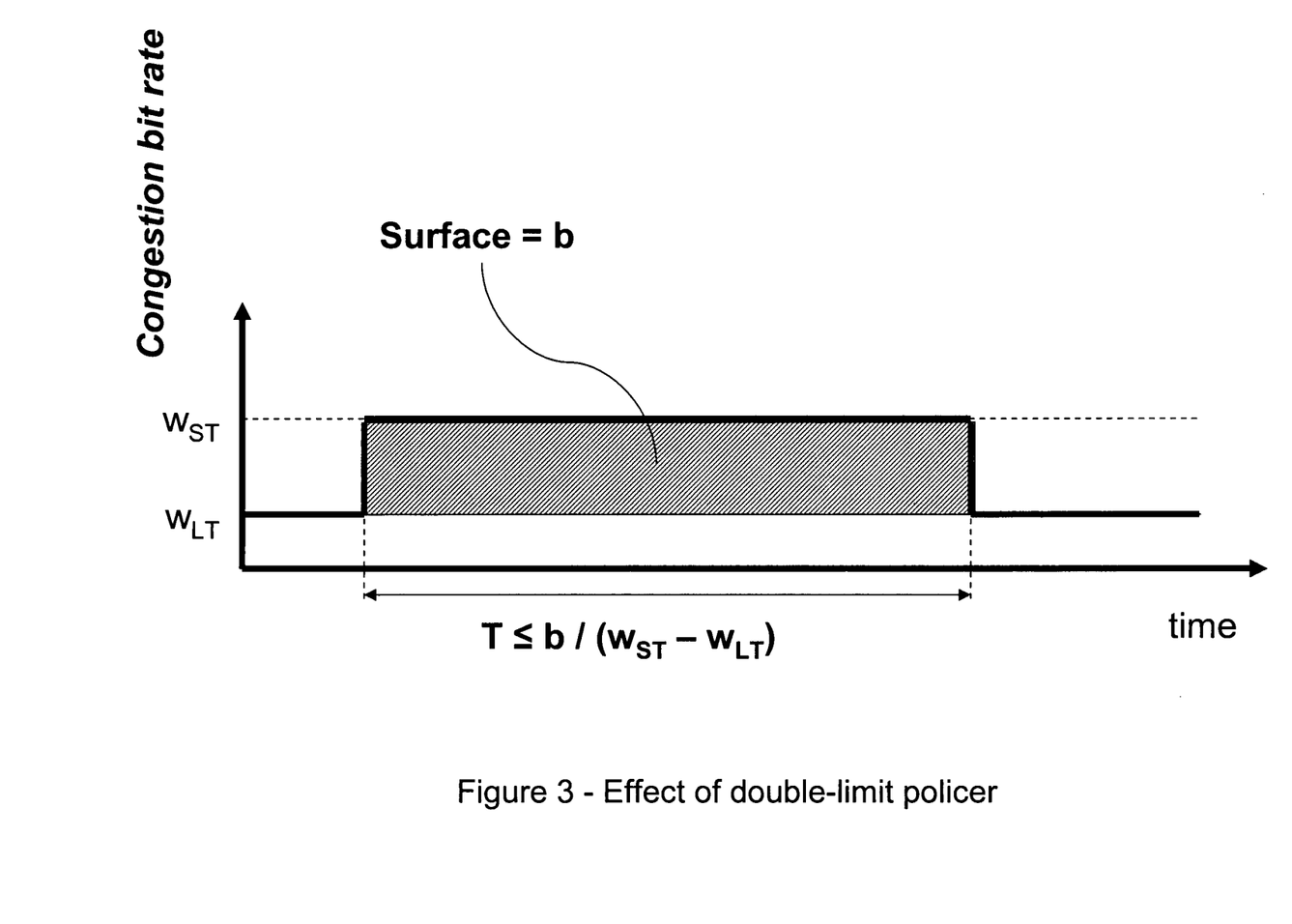
FIG. 3 is a graph which serves to illustrate an effect of using a double-limit policer in accordance with a preferred embodiment.

According to preferred embodiments, a "double-limit policer" or "double-bucket policer" mechanism enables the setting of two limits to the speed at which a user can create congestion in a network. As with the basic token bucket mechanism described earlier, a double-limit policer may use a long-term congestion bit rate $w_{LT}$, to control fair usage over a long-term period. Using a double-bucket policer also enables a user's usage to be controlled using a short-term congestion bit rate $w_{ST}$, which may be used to control short-term congestion bursts that may be permitted by a single token bucket mechanism due, for example, to a user having "saved-up" a significant reserve of what may be regarded as "congestion tokens". Such embodiments thus have significant advantages over single-limit congestion policers such as those discussed above with reference to International patent application WO 2006/082443 and [Jacquet08], in particular because these don't put a limit on the potentially harmful short-term congestion bit rate the traffic of a user can thus generate. Instead, as will be explained in more detail later and as is illustrated in FIG. 3, by additionally pacing packets (using the additional functionality that may be symbolised by the second—"leaky"—bucket) in order to ensure that the congestion bit rate never exceeds $w_{ST}$, even if a user has accumulated a significant congestion bit rate allowance b through a long period of inactivity, for example (under the functionality that may be symbolised by the first—"token"—bucket), a higher congestion bit rate $w_{ST}$ can only be sustained for a limited time T.

Referring again briefly to mechanisms such as those disclosed in the WRED proposal discussed earlier, which use double-limit policers in order to limit the throughput of the traffic generated by a user, it will be understood that such mechanisms deal only with traffic throughput, irrespective of whether the packets concerned have experienced any congestion or not, let alone the amount of congestion those packets have experienced. By using congestion bit rates as the trigger for policing action, rather than simply using data rates, preferred embodiments are able to react more specifically to behaviour likely to contribute significantly to network congestion.

BRIEF DESCRIPTION OF THE DRAWINGS

A preferred embodiment of the present invention will now be described with reference to the appended drawings, in which.

DESCRIPTION OF PREFERRED
EMBODIMENTS OF THE INVENTION

We present here the implementation details for a double-limit policer according to a preferred embodiment that may be used to control and/or limit both the long-term congestion bit rate and the short-term congestion burst of a single-user customer.

In this embodiment, congestion may be signalled in each packet by having the source set the re-ECN field to a given codepoint in proportion to the level of congestion it expects on the path of the packet (this follows the re-ECN protocol). The upstream congestion signal can be obtained from ECN marks in packets. The downstream congestion signal can be obtained by the difference between these two signals. More elaborate congestion decoding mechanisms may be required in circumstances where the policer is located at a point where upstream congestion is consistently high.

Another alternative would be to use multi-bit congestion fields in every packet, in order to allow each packet to carry an indication not just of whether or not it has experienced congestion, but of how much congestion it has experienced. Effects of this, and additional options resulting therefrom, will be discussed briefly below.

The functionality of a double-limit congestion policer will now be described in terms of "token bucket" and "leaky bucket" models with reference to FIG. 4. Initially, this may use steps corresponding to those applicable in the case of the single-limit policer presented in FIG. 1.

When a packet 15 arrives, it is first processed by a policing module according to the functionality symbolised by token bucket 41 that ensures that the long-term congestion bit rate doesn't exceed $w_{LT}$. The token bucket 41 is updated (step s410) with the updating involving two factors: it is filled at constant rate $w_{LT}$ (step s410a), and tokens are consumed from the bucket (step s410b) in proportion to the congestion signal associated with each packet forwarded, according to a function g( ) whose value depends on information retrieved from the packet header, in particular the size $s_i$ and the re-ECN field (which reflects a congestion level $p_i$). The function g( ) could be defined as:

| g(packet) = $s_i$ | if the re-ECN codepoint signals a mark |
|---|---|
| g(packet) = 0 | otherwise |

As a result, a flow with a throughput $x_i$ over a path with congestion $p_i$ consumes tokens at a rate $x_i * p_i$.

In view of the possibility outlined above that a multi-bit congestion field indicative of level of congestion experienced instead of or as well as single-bit or two-bit indication of whether or not congestion has been experienced, the function g( ) may instead be defined as:

$g(\text{packet}) = s_i * p_i$ where $p_i$ indicates the level of congestion experienced by the specific packet with which it is associated, rather than each of a plurality of packets either being marked or not marked in order to convey between them a measure of the amount of congestion $p_i$ on the path. Effectively this expression is simply more generic in that it also covers the binary case, which it would reflect by allowing the congestion indication of a packet to take one of two values: either $p_i=0$ or $p_i=1$.

Irrespective of the above issue of whether the congestion indications are indicative of whether or not an individual packet has experienced congestion (e.g. a single-bit "binary" congestion signal) or are indicative of a level of congestion experienced by the packet (e.g. a multi-bit congestion signal), if tokens are used more slowly than they are generated, they accumulate in the token bucket, and the token level is tracked by the variable r. A finite depth b may be given to the bucket to limit the amount of tokens a user may save up for future use.

If tokens are used more quickly than they are generated for a period of time, the token reserve r will decrease. When the value of r becomes lower than a given threshold (we use 0 as a threshold, for simplicity), a sanction according to an appropriate policy 42 may be applied (step s420) with a probability f(r) where the sanction curve f() increases as the token reserve r becomes more negative. For instance, the sanction may consist of packets being dropped, delayed or charged for, or marked (in order to allow a sanction to be applied later, or elsewhere, for example). As an alternative, rather than marking packets in order to allow a sanction to be applied, a report may be issued in respect of such packets, to a network control unit for example.

Figure 5:
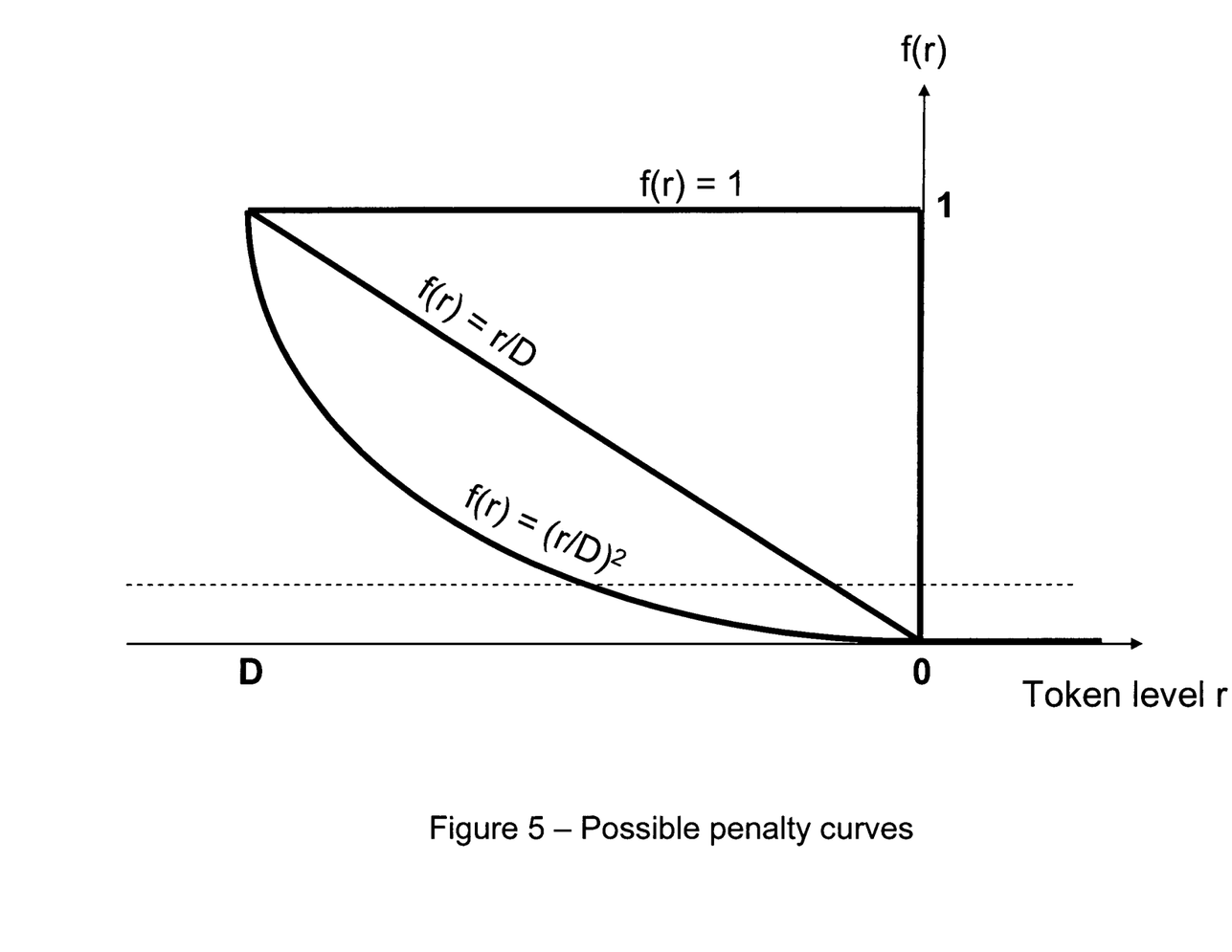
FIG. 5 is a graph showing possible penalty curves, illustrating how a sanction may be applied with a probability dependent on a current reserve value.

Examples of possible sanction curves are given in FIG. 5:
(1) a step function (symbolised by 51)
(2) a ramp function (symbolised by 52)
(3) a quadratic function (symbolised by 53)
but there are many other possible curves and functions, including those with changes in slope and/or multiple steps, for example. In most instances however, decreasing functions of some sort are generally applicable.

If this first stage (the policing module) allows for the packet to be forwarded (rather than subjected to "dropping" as a sanction), it is then processed to ensure that the instantaneous congestion bit rate doesn't exceed the short-term congestion burst level $w_{ST}$. This is achieved by using a rate-control module operating according to the functionality symbolised by a leaky bucket 43 driven by the aggregate congestion bit rate of the traffic, to set a congestion shaping constraint. An appropriate way to achieve this is to delay or "pace" packets such that they are forwarded at a rate $w_{ST}/p_{avg}$ (step s430) where $p_{avg}$ tracks the average congestion bit rate for the aggregate traffic.

If a multi-bit congestion field is available in the packet header it may be possible to schedule each packet to be sent after an interval of time $p_i/w_{ST}$ following the time when the previous packet was sent, where $p_i$ is the value of the congestion field in that packet.

If congestion is given a binary signal per packet, then the average congestion may be updated every time a packet needs forwarding, for instance using an exponentially weighted moving average (EWMA). For instance, when packet i needs forwarding, average congestion $p_{avg}$ is updated to:

$$p_{avg}(i)=p_{avg}(i-1)*(1-a*s_i)+p_i*a*s_i$$

and packet i is transmitted at time $$t_{forward}(i)=\max(t_{arrival}(i),t_{forward}(i-1)+p_{avg}(i)*s_i/w_{ST})$$

In some situations, it may be appropriate to pace traffic on the basis of congested packets rather than on the basis of congested bytes (i.e. ignoring the size of each packet that has experienced congestion when determining how to police the flow). This may be achieved using a similar mechanism to the above, but replacing the effective packet size $s_i$ with a nominal packet size $s_{ref}$.

The presence of the leaky bucket 43 potentially allows for the token bucket 41 effectively to have infinite depth (as the overall rate of forwarding would still be limited as appropriate by the leaky bucket), although in most situations it may be more practical for the depth to be finite, in order to allow processing to be achieved with a finite-sized register.

In the long-term, the user can still sustain congestion bit rates lower than $w_{LT}$ without getting policed (i.e. without any sanction being applied). However if the policer always operates in saturation mode (i.e. with tokens being used up as quickly as they are generated), the will generally not be permitted to sustain a congestion bit rate higher than $w_{LT}$.

As illustrated in FIG. 3, if the user has accumulated a congestion bit rate allowance b in the token bucket, through a period of inactivity, for example, it then has a reserve of "allowable congestion" that can be used up without getting policed, and can sustain a higher congestion bit rate $w_{ST}$, but this may only be for a time T such that $$w_{ST}*T=b+w_{LT}*T,$$

which limits the duration of that behaviour to $T=b/(w_{ST}-w_{LT})$.

Figure 4:
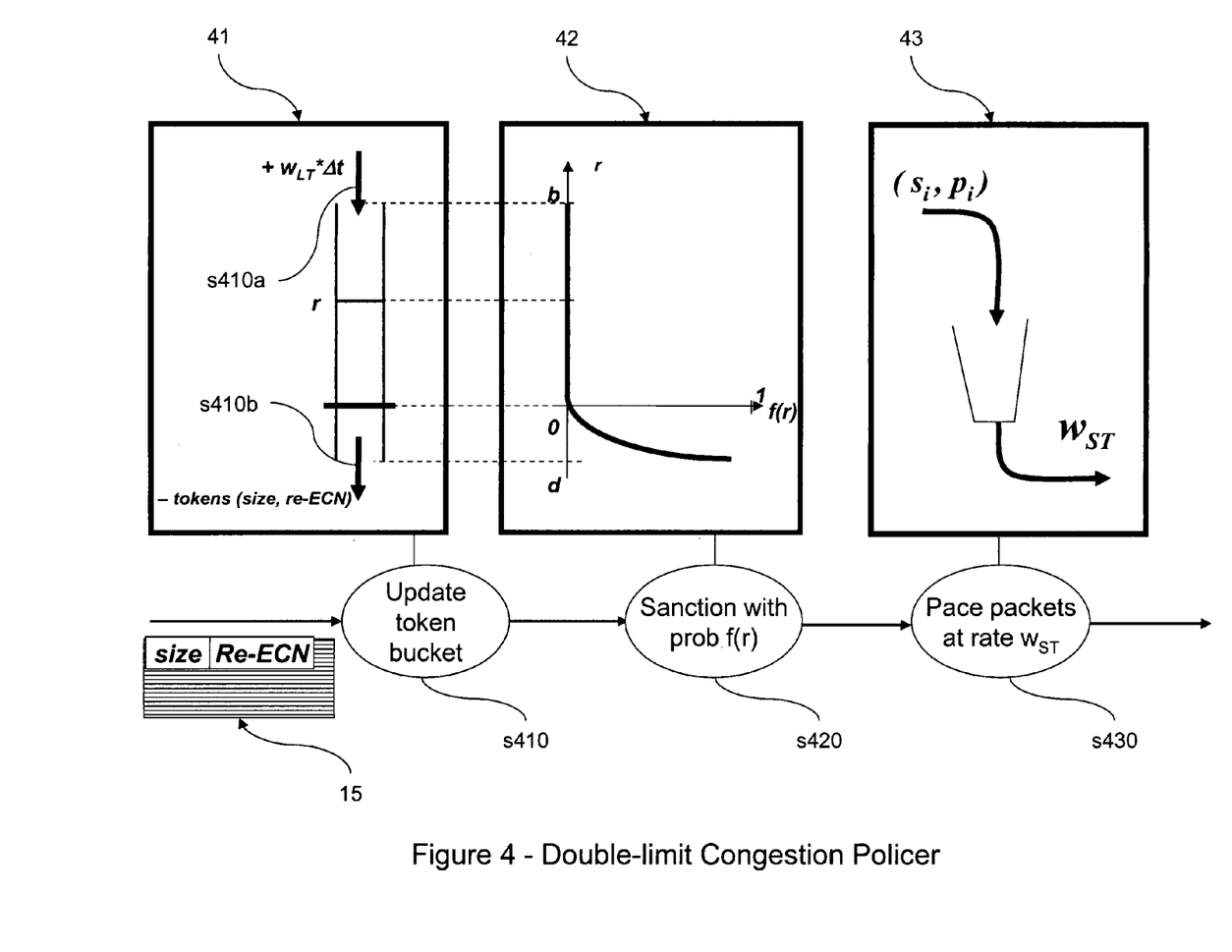
FIG. 4 shows a schematic diagram of a double-limit congestion policer in accordance with a preferred embodiment.

It will be understood that components shown in FIG. 4 such as the token bucket 41 (performing the function of the policer or policing module) and the token bucket 43 (performing the function of the rate-controller or rate-control module) need not be separate physical components of the overall apparatus. The functions attributed to these and other components may in fact be performed by the same processor in a routing node or policing node, for example, with the results of processing to achieve the functionality attributed to one component then being used (where applicable) in a subsequent routine whereby to achieve the functionality attributed to another.

A possible series of process steps that may be performed by a processor in order to perform a method according to a preferred embodiment will now be explained with reference to FIG. 6, which illustrates, using terms other than those of the token bucket and leaky bucket models, a policing method that may be performed by a policing node where the sanction to be applied (in the event of it being appropriate) involves dropping packets.

Figure 6:
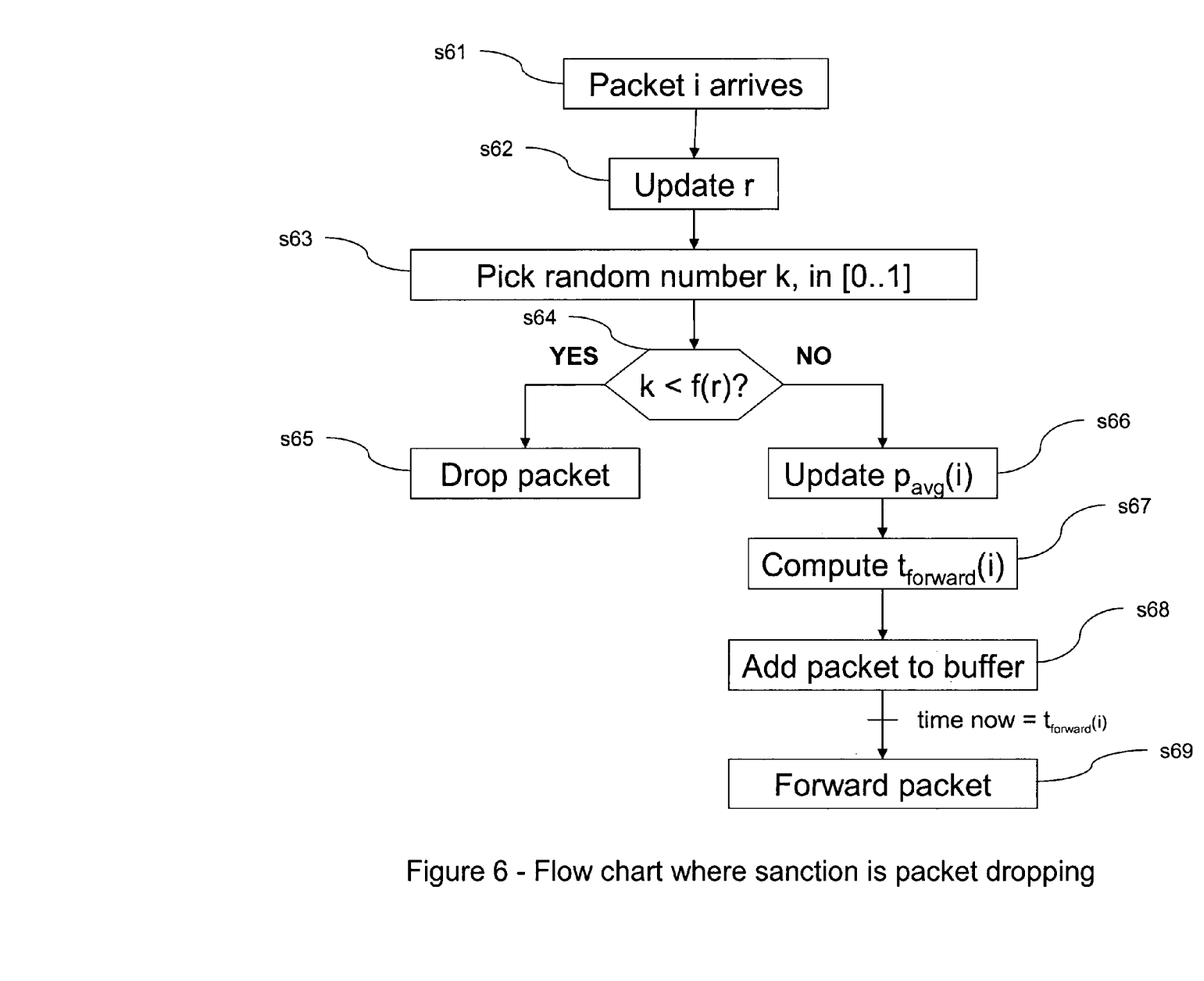
FIG. 6 is a flow-chart illustrating a policing method that may be performed by a policing node according to a preferred embodiment, where the sanction applied involves dropping packets.

With reference to FIG. 6, when a packet 15 arrives (step s61), it is monitored in order to determine whether is has an indication associated therewith indicating that it has already experienced congestion. It is then processed by a policing module, with the reserve value r of an appropriate register being updated (step s62), the updating involving the two factors explained earlier: the register may be incremented at a constant rate $w_{LT}$ (corresponding to step s410a of FIG. 4), while also being decremented (step s410b) in dependence on the congestion indication associated with the packet.

If the updating of the register results in the register being decremented faster than it is incremented, the reserve value r held in the register will decrease and may reach or cross a predetermined threshold, which may result in it becoming appropriate to apply the sanction of dropping packets, possibly in a probabilistic manner. Depending on the chosen policy, the sanction may be applied with a probability f(r) by picking a random number k in the range [0 . . . 1] (step s63), determining if k is less than f(r) (step s64), and if so, dropping the packet (step s65). If not, the packet is not dropped, and may therefore be processed further.

Figure 7:
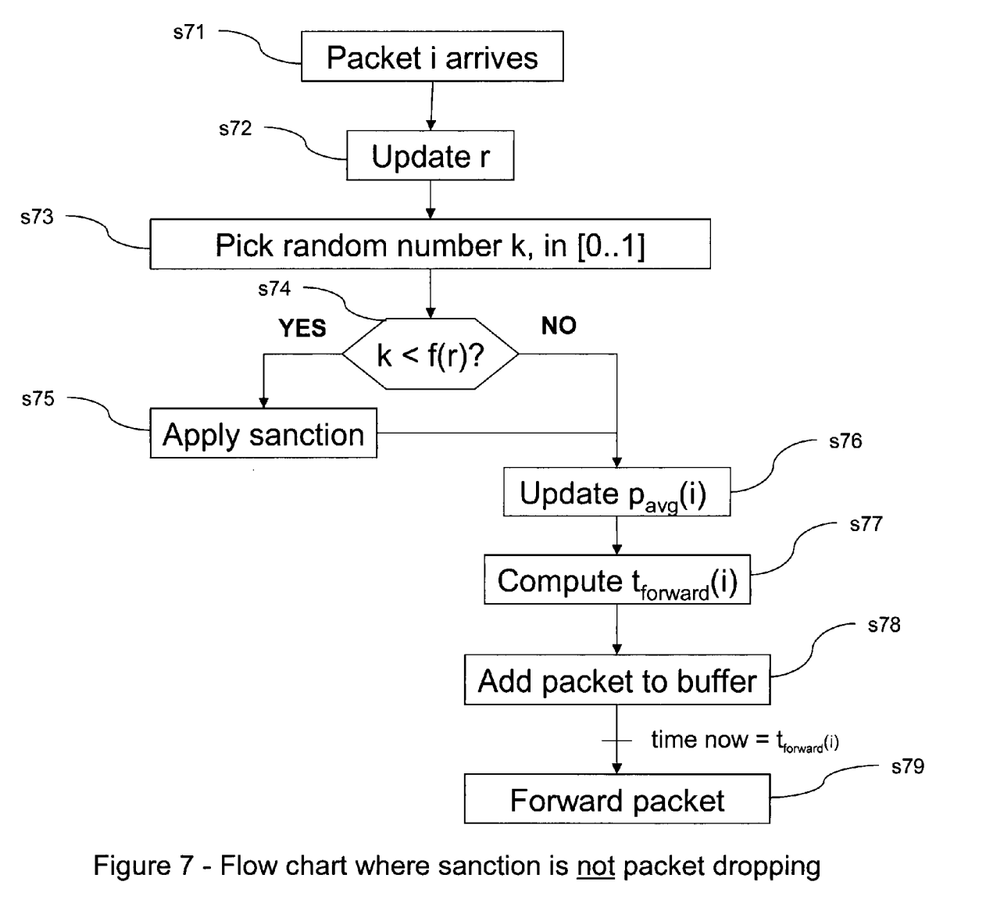
FIG. 7 is a flow-chart illustrating a policing method that may be performed by a policing node according to a preferred embodiment, where the sanction applied involves an action other than dropping packets.

If the packet is not dropped by the policing module, it may then be processed by the rate-control module. The average congestion bit rate $p_{avg}$ for the aggregate traffic is updated in the light of the congestion indication associated with the packet (step s66), and from this, a time $t_{forward}$ at which the packet will be forwarded is calculated (step s67). The packet is then put in a buffer (step s68) where it is held until the appropriate time is reached, at which point it is forwarded (step s69).

Where the sanction to be applied (in the event of it being appropriate) involves a policing action other than dropping packets, a slightly different series of process steps may be performed, which will be briefly explained with reference to FIG. 7. Most of the steps of this correspond to those of FIG. 6, but after steps s71 to s74 (which correspond to steps s61 to s64 of FIG. 6), instead of the possible step of dropping the packet (step s65), there is a possible step of applying a sanction other than dropping to the packet (step s75). The sanctioned packet, having not been dropped, may then remain in the flow (as indicated by the line from step s75 to step s76) and be processed further, along with unsanctioned packets, according to steps s76 to s79 (which correspond to steps s66 to s69).

With either of the above versions, the step of updating $p_{avg}$ (step s66 or s76) may occur before or after the decision (step s64 or s74) regarding whether or not a sanction is to be performed, and may occur before or after any sanction is be performed (step s65 or s75). Minor timing differences may be caused by either of the above options, as they may affect whether or not sanctioned packets contribute to the updating of $p_{avg}$.

Further to the above, the (long-term) policer (i.e. token-bucket) functionality need not be performed before the (short-term) rate-controller (i.e. leaky-bucket) functionality, as in the embodiments described earlier. The rate-control module may instead process received packets first, delaying their forwarding if appropriate, then forwarding them to the policing module in order for any appropriate sanctioning to be performed. Such a re-ordering may have a minor effect on overall policing in particular in versions where the sanction involves packet dropping, as packets dropped by a policing module prior to processing of packets by a rate-control module may not be processed by the rate-control module at all, whereas packets dropped by a policing module after processing of packets by a rate-control module may well have contributed to or influenced the behaviour of the rate-control module. It may also be arranged for the rate-control module and the policing module to perform their respective functions in respect of a particular packet concurrently.

The invention claimed is:

1. An apparatus for policing a flow of data units along a path in a data network, said apparatus comprising:
   a receiver for receiving data units, respective data units having readable congestion indications associated therewith on receipt by the apparatus indicating whether or not said data units have experienced or are expected to experience congestion on the path;
   a data unit monitor operable to read the congestion indications associated with respective received data units;
   a policer comprising:
      a register operable to hold a reserve value indicative of a current reserve level;
      a register updater operable to update the reserve value; and
      a policing component operable to perform a policing action in respect of a data unit in dependence on a predetermined policing function such that the probability of said policing action being performed in respect of said data unit is dependent on the current reserve value; and
   a rate-controller;
   wherein said register updater is operable to update the reserve value at a predetermined rate, and further to update the reserve value in dependence on congestion indications associated with respective received data units; and
   wherein said rate-controller comprises a buffer operable to delay one or more of said received data units for a period of time dependent on the congestion indications respectively associated with said one or more of said received data units.

2. An apparatus according to claim 1 wherein said receiver is arranged to make received data units available for processing by said policer; wherein said policer is arranged to make at least some of said data units available for processing by said rate-controller; and wherein said rate-controller is arranged to make at least some of said data units available for forwarding from said apparatus.

3. An apparatus according to claim 1 wherein said receiver is arranged to make received data units available for processing by said rate-controller; wherein said rate-controller is arranged to make at least some of said data units available for processing by said policer; and wherein said policer is arranged to make at least some of said data units available for forwarding from said apparatus.

4. An apparatus according to claim 1 wherein said policing action comprises one or more of the following actions in respect of a data unit: dropping said data unit; delaying onward transmission of said data unit; assigning a sanction indication to said data unit in order to enable said data unit to be identified for subsequent sanction; issuing a report to a network control unit in respect of said data unit.

5. An apparatus according to claim 1 wherein congestion indications associated with said data units provide indications of the levels of congestion experienced by, or expected to be experienced by, said data units.

6. An apparatus according to claim 5 wherein said register updater is further operable to update the reserve value in dependence on the levels of congestion indicated by said congestion indications as having been experienced by, or expected to be experienced by, said data units.

7. An apparatus according to claim 5 wherein said rate-controller is operable to delay data units for periods of time dependent on—the levels of congestion indicated by said congestion indications as having been experienced by, or expected to be experienced by, said data units.

8. An apparatus according to claim 1 wherein said data unit monitor is further operable to determine size measures in respect of received data units indicative of the size of said data units.

9. An apparatus according to claim 8 wherein said register updater is further operable to update the reserve value in dependence on the size measures determined in respect of said data units.

10. An apparatus according to claim 8 wherein said rate-controller is operable to delay data units for periods of time dependent on the size measures determined in respect of said data units.

11. An apparatus according to claim 1 wherein said register updater is operable to update the reserve value at said predetermined rate in order to increase the difference between the reserve level indicated by said reserve value and a predetermined threshold level, and to update the reserve value in dependence on said congestion indications whereby to decrease the difference between the reserve level indicated by said reserve value and said predetermined threshold level.

12. An apparatus according to claim 1 wherein said register updater is arranged to prevent the reserve value from being updated beyond either or both of a predetermined maximum value and a predetermined minimum value.

13. An apparatus according to claim 1 wherein the policer and the rate-controller are arranged such as to allow data units having congestion indications associated therewith to be forwarded at least during a temporary period of high congestion at a rate that is greater than an average rate over a period longer than said temporary period at which the predetermined rate at which the register updater updates the reserve value allows data units having congestion indications associated therewith to be processed by the policer without having a policing action performed thereon.

14. A method for policing a flow of data units along a path in a data network, said method comprising:
- receiving data units, by an apparatus, respective data units having readable congestion indications associated therewith on receipt by the apparatus indicating whether or not said data units have experienced or are expected to experience congestion on the path;
- reading the congestion indications associated with respective received data units;
- a policing process comprising:
  - holding a reserve value indicative of a current reserve level;
  - updating the reserve value; and
  - performing a policing action in respect of a data unit in dependence on a predetermined policing function such that the probability of said policing action being performed in respect of said data unit is dependent on the current reserve value; and
- a rate-control process;
- wherein updating the reserve value comprises updating the reserve value at a predetermined rate, and further updating the reserve value in dependence on congestion indications associated with respective received data units; and
- wherein said rate-control process comprises delaying one or more of said received data units for a period of time dependent on the congestion indications respectively associated with said one or more of said received data units.

15. A method according to claim 14, further comprising forwarding at least some of said received data units on towards an eventual destination after subjecting said data units to said policing process and said rate-control process.

16. An apparatus according to claim 1 wherein said congestion indications are carried by said respective data units.

17. An apparatus according to claim 1 wherein said respective data units have header portions, and said congestion indications are included in the header portions of said respective data units.

18. A method according to claim 14 wherein said congestion indications are carried by said respective data units.

19. A method according to claim 14 wherein said respective data units have header portions, and said congestion indications are included in the header portions of said respective data units.

* * * * *